(12) United States Patent
Wright

(10) Patent No.: US 10,086,250 B2
(45) Date of Patent: Oct. 2, 2018

(54) TENNIS TRAINING DEVICE

(71) Applicant: Wright Tennis, Inc., Alpharetta, GA (US)

(72) Inventor: Dylan Taylor Wright, Alpharetta, GA (US)

(73) Assignee: Wright Tennis, Inc., Alpharetta, GA (US)

( * ) Notice: Subject to any disclaimer, the term of this patent is extended or adjusted under 35 U.S.C. 154(b) by 0 days.

(21) Appl. No.: 15/365,805

(22) Filed: Nov. 30, 2016

(65) Prior Publication Data

US 2017/0151480 A1      Jun. 1, 2017

Related U.S. Application Data

(60) Provisional application No. 62/261,155, filed on Nov. 30, 2015.

(51) Int. Cl.
  *A63B 69/38*     (2006.01)
  *G09B 19/00*     (2006.01)

(52) U.S. Cl.
  CPC .......... *A63B 69/38* (2013.01); *G09B 19/0038* (2013.01); *A63B 2209/08* (2013.01)

(58) Field of Classification Search
  CPC ..... A63B 69/38; A63B 69/36; A63B 69/3608; A63B 69/00; A63B 69/002; A63B 69/0017; A63B 69/0071; A63B 69/0057; A63B 2209/08; A63B 2209/10; G09B 19/0038
  See application file for complete search history.

(56) References Cited

U.S. PATENT DOCUMENTS

| | | | | |
|---|---|---|---|---|
| 4,209,169 A | * | 6/1980 | Roberts | A63B 69/38 473/464 |
| 4,239,228 A | * | 12/1980 | Norman | A63B 69/0059 128/878 |
| 4,892,317 A | * | 1/1990 | Corder, Jr. | A63B 69/0059 473/212 |
| 5,005,833 A | | 4/1991 | Groveman et al. | |
| 5,348,292 A | * | 9/1994 | Norman, Sr. | A63B 69/0059 473/213 |
| 5,476,257 A | * | 12/1995 | Bobby | A63B 69/0059 473/464 |
| 5,618,040 A | * | 4/1997 | Parten | A63B 21/0004 473/461 |
| 5,807,218 A | * | 9/1998 | Nagatomo | A61F 5/3715 128/869 |

(Continued)

*Primary Examiner* — Raleigh W Chiu
(74) *Attorney, Agent, or Firm* — Troutman Sanders LLP; James E. Schutz; Christopher C. Close, Jr.

(57) ABSTRACT

Embodiments of the present disclosure can comprise systems and devices for improving a player's tennis swing timing. In some embodiment, the systems and devices can comprise a first band having a first sleeve affixed thereto and a second band having a second sleeve affixed thereto. An inner tubing can extend substantially between the first end of the first sleeve and the first end of the second sleeve. Additionally, the first sleeve can house a first magnetic component and the second sleeve can oppose the first sleeve and house a second magnetic component. The first and second magnetic components can be configured to transition the first and second sleeves from an unconnected state, in which at least a portion of the inner tubing is disposed between the first sleeve and the second sleeve, to a connected state.

20 Claims, 12 Drawing Sheets

(56) References Cited

U.S. PATENT DOCUMENTS

| | | | |
|---|---|---|---|
| 6,514,163 B2 * | 2/2003 | Burns | A63B 21/00185 473/422 |
| 6,827,654 B2 | 12/2004 | Meyer | |
| 6,846,254 B2 * | 1/2005 | Baxter | A63B 69/0059 473/450 |
| 6,939,246 B1 | 9/2005 | Minichino et al. | |
| 7,147,581 B1 * | 12/2006 | Williams, III | A63B 69/0059 473/464 |
| 7,354,361 B2 | 4/2008 | Williams, III | |
| 7,381,140 B1 * | 6/2008 | Stanisic | A63B 69/3608 473/464 |
| 7,399,240 B2 * | 7/2008 | Paukert | A63B 69/0071 128/878 |
| 7,758,436 B2 | 7/2010 | Reynolds | |
| 8,052,546 B1 * | 11/2011 | Nagel | A63B 21/4019 473/422 |
| 8,052,548 B1 | 11/2011 | Stanisic et al. | |
| D652,882 S * | 1/2012 | Nagel | D21/781 |
| 8,337,371 B2 * | 12/2012 | Vollmer, Jr. | A63B 23/0355 482/124 |
| 8,777,783 B1 | 7/2014 | Rodgers, Jr. et al. | |
| 9,242,159 B1 * | 1/2016 | Lacoste | A63B 69/0002 |
| 9,440,131 B2 * | 9/2016 | Mueller | A63B 69/0002 |
| 2002/0193188 A1 * | 12/2002 | Wah Loh | A63B 69/0059 473/458 |
| 2007/0087868 A1 * | 4/2007 | Williams, III | A63B 69/0059 473/464 |
| 2007/0275796 A1 * | 11/2007 | Carter | A63B 69/38 473/459 |
| 2008/0214330 A1 * | 9/2008 | Goebel | A63B 21/0004 473/438 |
| 2008/0220911 A1 * | 9/2008 | Rodgers | A63B 69/38 473/461 |
| 2009/0098945 A1 | 4/2009 | George | |
| 2013/0324331 A1 | 12/2013 | Barnhill | |
| 2014/0057743 A1 * | 2/2014 | Leggett | A63B 69/0002 473/458 |
| 2015/0335975 A1 * | 11/2015 | Ahn | A63B 69/0059 473/461 |
| 2016/0089561 A1 * | 3/2016 | Oravecz | A63B 21/1438 473/518 |
| 2017/0151480 A1 * | 6/2017 | Wright | A63B 69/38 |

* cited by examiner

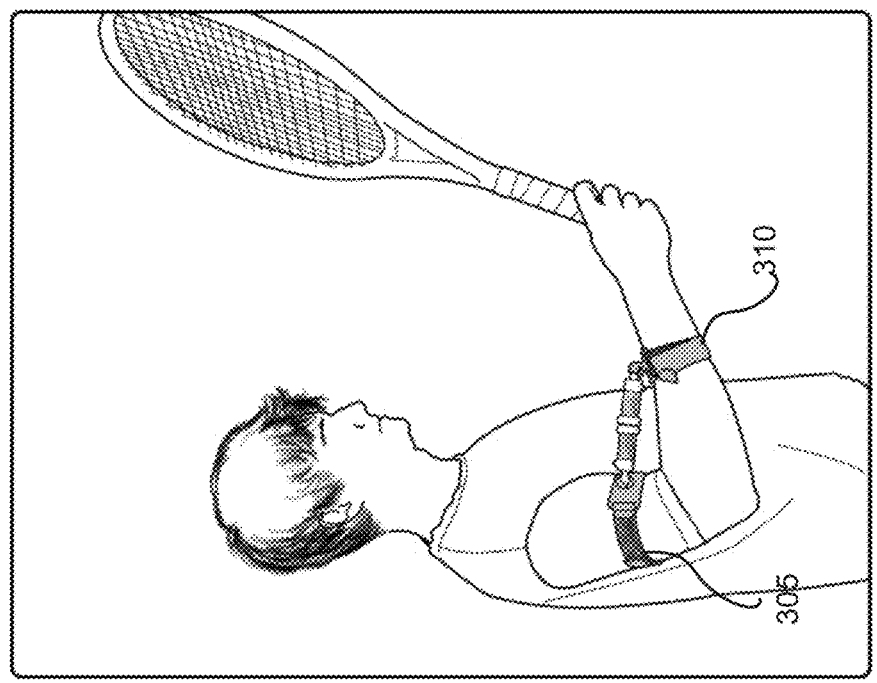
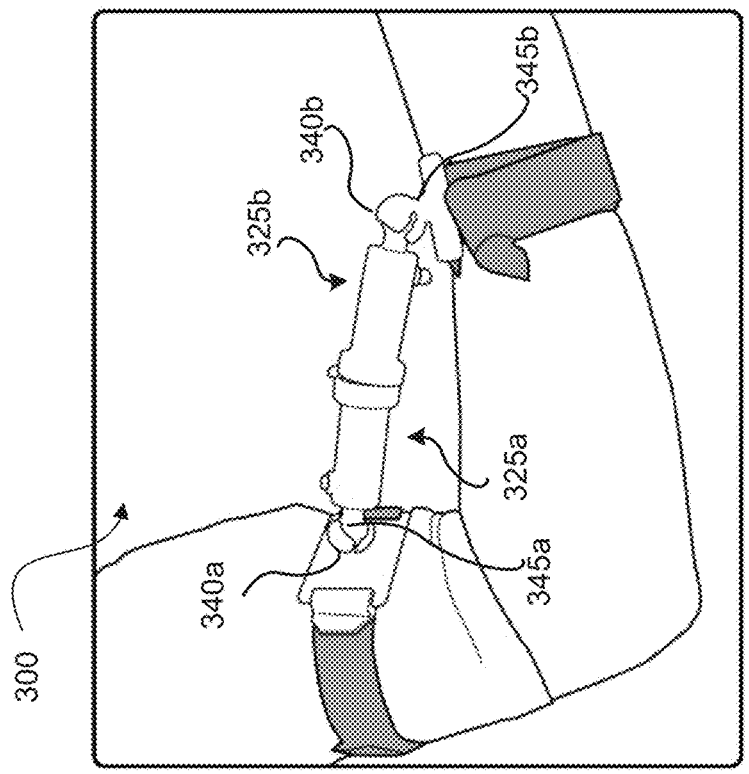
FIG. 3A
FIG. 3B

TENNIS TRAINING DEVICE

CROSS-REFERENCE TO RELATED APPLICATIONS

This Application claims priority to and benefit under 35 U.S.C. § 119(e) of U.S. Provisional Patent Application No. 62/261,155 filed Nov. 30, 2015, which is hereby incorporated by reference herein in its entirety as if fully set forth below.

FIELD OF THE INVENTION

The presently disclosed subject matter relates generally to tennis training devices for improving a variety of tennis swings. Specifically, the presently disclosed subject matter relates to tennis swing timing devices, forehand groundstroke devices, and groundstroke preparation devices.

BACKGROUND

Proper tennis swings require a balancing of opposing forces. On one hand, tennis swings are rotational, with a player's hips providing the rotation. On the other hand, tennis swings exist upwards and downwards on a vertical plane. To achieve these forces together, the player must remain relaxed, let gravity take the weight of the racket, and properly time the beginning of hip rotation with the upper body. In other words, to hit a proper tennis swing, the player must use her body on the forward swing in a specific, timed sequence, beginning with the hips and then continuing through the upper body, arm, wrist, hand, and finally the racket. Proper timing then ensures the racket is in the proper position to obtain correct downward and upward vertical motion of the swing.

Yet, proper tennis swing technique is not intuitive, even for exceptional athletes. Where proper technique requires using the correct muscles in a well-timed sequence, starting with the lower body, beginning players often use only their arms to hit with the racket. In some instances, beginning players may engage in "reaching back" or "dropping down" with their arms during preparation and initiating the forward swing with their upper body. Hitting the ball this way is often instinctive for beginning players as using the upper body and the arms is a reliable way to make contact with a moving tennis ball while navigating the court quickly. However, using the upper body and arms to hit the ball rather than the hips and legs can negatively affect a player's movement, resulting in less control and power throughout the swing.

Known tennis training devices seek to correct body angles during a tennis swing instead of improving body synchronization during the swing. Additionally, other devices operate as a crutch, lacking the flexibility to allow the player to develop proper body positioning on her own.

Accordingly, there is a need for tennis training devices to address the above-mentioned deficiencies. Embodiments of the present disclosure are directed to these and other considerations.

SUMMARY

Briefly described, embodiments of the presently disclosed subject matter relate to systems and devices for improving tennis swing timing and preparation. In some embodiments of the present disclosure, a tennis training system can comprise a first band adapted to be worn on an upper portion of a wearer's first arm and a second band adapted to be worn on a lower portion of the wearer's first arm. The system can comprise a first sleeve and a second sleeve affixed to the first and second band. For instance, the first sleeve can have a first end and a second end with the first end affixed to the first band and the second sleeve can oppose the first sleeve, and the second sleeve can have a first end affixed to the second band. Additionally, the system can comprise an inner tubing that can extend substantially between the first end of the first sleeve and the first end of the second sleeve.

The first sleeve and the second sleeve can each house a magnetic component. For instance, a first magnetic component can be disposed within the second end of the first sleeve and a second magnetic component can be disposed within the second end of the second sleeve. The first and second magnetic components can be configured to transition the first and second sleeves from an unconnected state, in which at least a portion of the inner tubing is disposed between the first sleeve and the second sleeve, to a connected state. Additionally, the tension created between the upper and lower portions of the wearer's first arm can be at an angle between the upper and lower portions In some embodiments, the system and devices can comprise a first ball connector integral to the first end of the first sleeve and a second ball connector integral to the first end of the second sleeve. Additionally, the first band can comprise a first socket connector adapted to receive the first ball connector and the second band can comprise a second socket connector adapted to receive the second ball connector.

In some embodiments, a central portion of the first sleeve and a central portion of the second sleeve can comprise a pliable material and the second end of the first sleeve and the second end of the second sleeve can comprise a rigid material. Additionally, in some embodiments the inner tubing can comprise an elastic material such that when the magnetic components are in an unconnected state, the inner tubing increases in length.

When worn by a wearer, the magnetic components can be in a connected state with the angle between the upper and lower portions of the wearer's first arm is 90 degrees or less. Otherwise, when the magnetic components are in an unconnected state, angle between the upper and lower portions of the wearer's first arm is greater than 90 degrees.

Additionally, embodiments of the presently disclosed subject matter can relate to a forehand groundstroke device. The forehand groundstroke device can comprise a first band, a second band, a resistance tubing, and an extension component. The resistance tubing can be adapted to connect between the first band and the extension component, and the extension component can be adapted to connect between the resistance tubing and the second band. When worn by a wearer the first band can attach around the arm of the wearer, the second band can attach around an upper leg of the wearer, and the extension component can elevate the resistance tubing proximate the waist of the wearer.

Embodiments of the presently disclosed subject matter can relate to a groundstroke preparation device. The groundstroke preparation device can comprise a first band, a second band, and adherent components. The second band can comprise an insert that extends from the second band towards the first band. When worn by a wearer, the first band can attach around the upper arm of the wearer, and the second band can attach around the torso of a wearer. The adherent components can be configured to transition the device from a connected state to an unconnected state. When in a connected state, the adherent components can attach together, and hold the upper arm of the wearer proximate the torso of the wearer.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

FIGS. 3A and 3B illustrate a tennis swing timing device in a connected state when worn by a wearer, in accordance with some embodiments of the present disclosure.

DETAILED DESCRIPTION

Figure 1A:
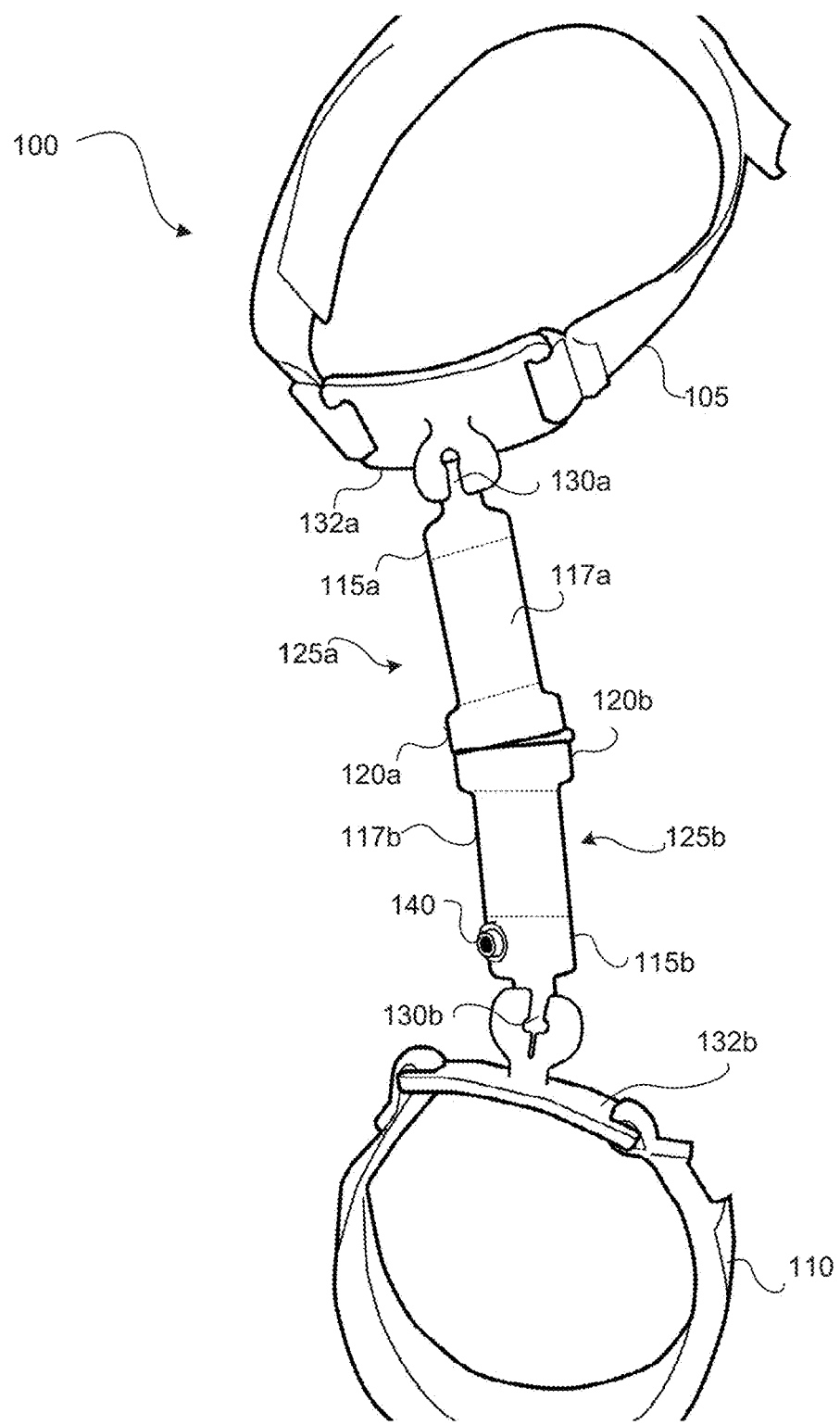
FIGS. 1A and 1B illustrate a tennis swing timing device in a connected state and a unconnected state, respectively, in accordance with some embodiments of the present disclosure.

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of tennis training devices for improving a variety of tennis swings. Specifically, the presently disclosed subject matter relates to tennis swing timing devices, forehand groundstroke devices, and groundstroke preparation devices.

Referring now to the figures, wherein like reference numerals represent like parts throughout the views, the connector system will be described in detail.

Systems and Devices for Improving Tennis Swing Timing

One problem many tennis players face occurs with timing the sequence of movements making up a tennis swing. Good timing is imperative to strike an on-coming tennis ball with adequate pace, spin, and depth, while maintain power and control throughout the swing. Because proper timing in tennis is often counter-intuitive, one or more of the tennis swing timing devices described herein can train tennis players to learn proper swing timing. For instance, aspects of the present disclosure can train a wearer (i.e., a tennis player) of the device to begin a swing with her hips, followed by her upper body, and then using the weight and momentum of the racket to generate a proper swing. It can do so by intervening or providing feedback to the wearer that good timing was not achieved.

Figure 1B:
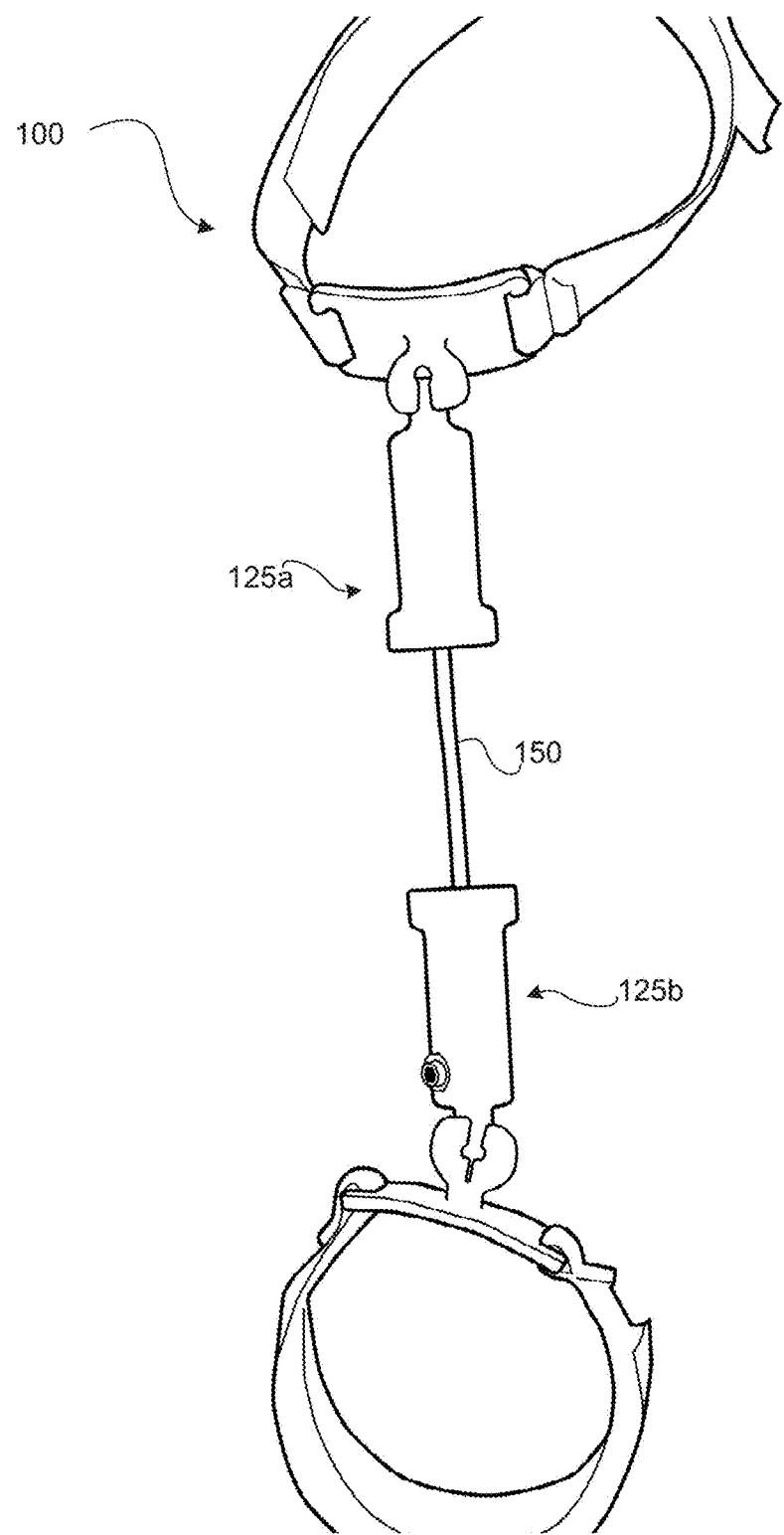

FIGS. 1A and 1B illustrate a tennis swing timing device 100 in a connected state and an unconnected state respectively, in accordance with one or more embodiments of the present disclosure. As illustrated in FIGS. 1A and 1B, the tennis swing timing device can comprise a first band 105 and a second band 110. The first band 105 can be affixed to a first sleeve 125a and the second bad 110 can be affixed to a second sleeve 125b. The first sleeve 125a can comprise a first end 115a and a second end 120a, with the first end 115a affixed to the first band 105 via a ball-and-socket attachment 130a. Similarly, the second sleeve 125b can comprise a first end 115b and a second end 120b, with the first end 115b affixed to the second band 110 via a ball-and-socket connector 130b.

When in a connected state, and as illustrated at FIG. 1A, the second end 120A of the first sleeve 125a can abut the second end 120b of the second sleeve 125a. In some embodiments, the first sleeve 124a and the second sleeve 125b can be connected via first and second magnetic components 170a, 170b, illustrated in greater detail with respect to FIGS. 1B and 1C. The disclosed tennis swing timing device 100 can also comprise an inner tubing 150. As described below in connection with FIG. 1C, the inner tubing 150 can be housed within the first sleeve 125a and the second sleeve 125b In some embodiments, the inner tubing 150 can be attached proximate two opposing ends of the first and second sleeves 125a, 125b using two or more pin members 140, as illustrated in FIG. 1A. For instance, the inner tubing 150 can extend substantially between the first end 115a of the first sleeve 125a and the second end 115b of the second sleeve 125b.

FIG. 1B illustrates a tennis swing timing device 100 in an unconnected state, in accordance with some embodiments of the present disclosure. As discussed in greater detail below, the first and second magnetic components 170a, 170b can be configured to transition the device from the unconnected state (shown in FIG. 1B) to the connected state (shown in FIG. 1A). When in an unconnected state, as shown at FIG. 1B, the first sleeve 125a and the second sleeve 125b can be separated and a portion of the inner tubing 150 can be exposed between the two sleeves.

Figure 1C:
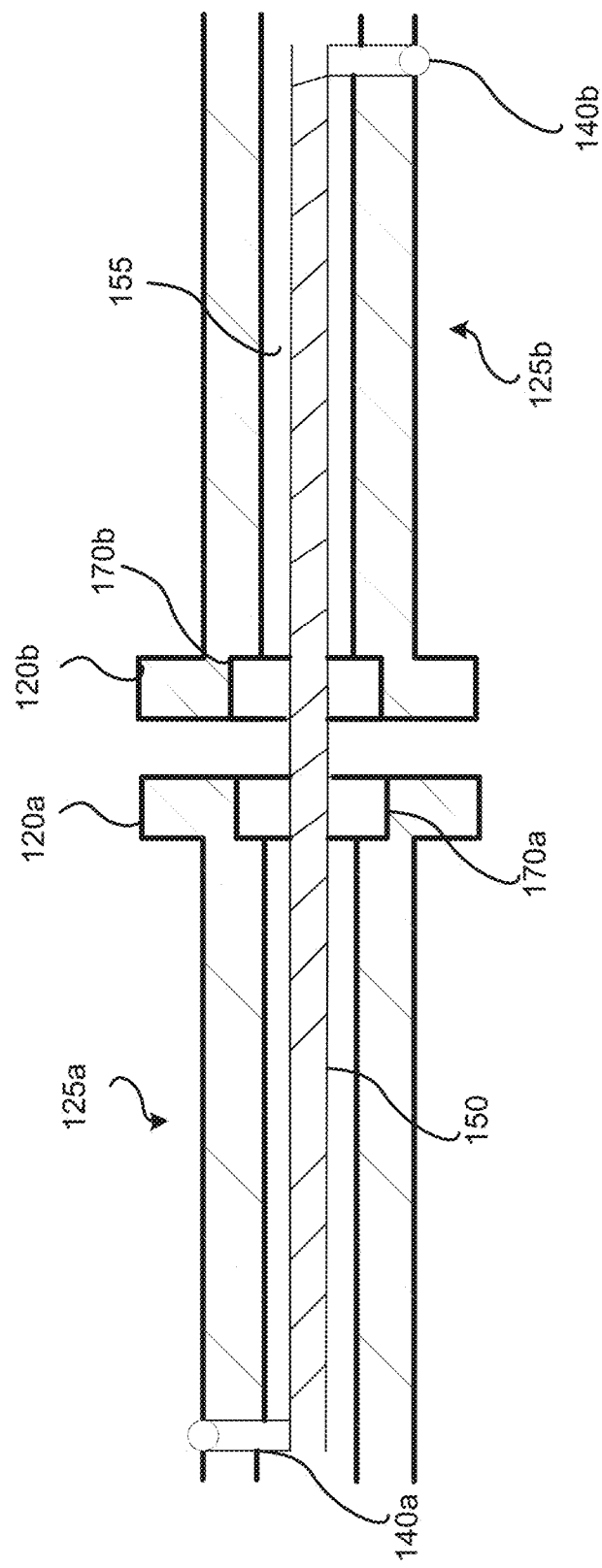
FIG. 1C is a cross-sectional view of a tennis swing timing device in an unconnected state, in accordance with some embodiments of the present disclosure.

In some embodiments, the first and second sleeves 125a, 125b can house an inner tubing 150. FIG. 1C shows a cross-sectional view of the tennis swing timing device 100 having an inner tubing 150 housed within the first and second sleeves 125a, 125b, in accordance with one or more exemplary embodiments. As illustrated at FIG. 1C, the first and second sleeves 125a, 125b can be hollow such that a channel 155 can be formed axially within the first and second sleeves 125a, 125b. The inner tubing 150 can be disposed within the channel 155 and attached proximate a first end 115a of the first sleeve 125a. The inner tubing 150 can extend from its attachment point at the first end 115a of the first sleeve 125a, through the first sleeve 125a, and into the second sleeve 125b, attaching in a similar manner proximate the first end 115b of the second sleeve 125b. When in an unconnected state, as illustrated at FIGS. 1B and 1C, at least a portion of the inner tubing 150 can be exposed (e.g. visible) between the first sleeve 125a and the second sleeve 125b.

Figure 1D:
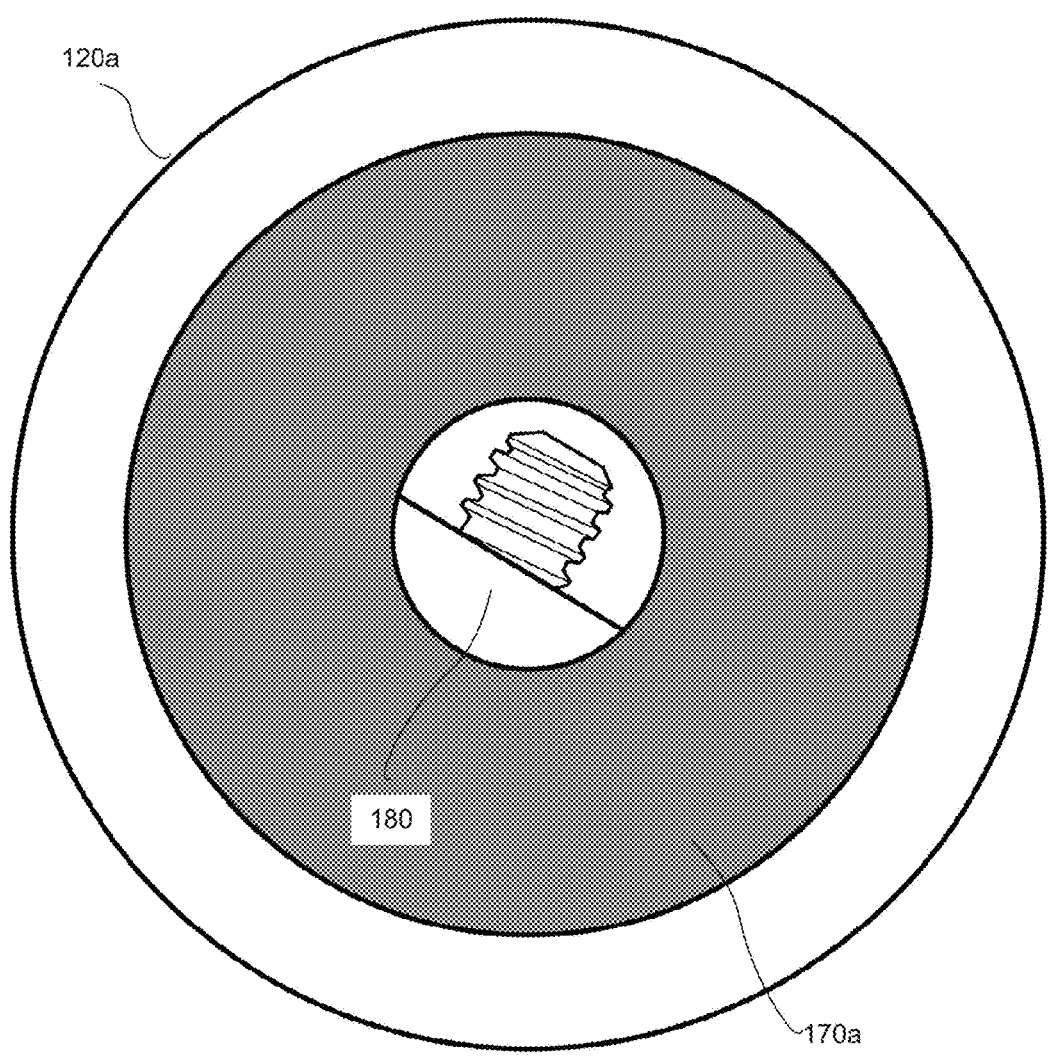
FIG. 1D illustrates an end of a first sleeve of a tennis swing timing device, in accordance with some embodiments of the present disclosure.

As illustrated in FIG. 1C, the first sleeve 125a and the second sleeve 125b can be releaseably connected. In some embodiments, the first sleeve 125a and the second sleeve 125b can comprise a first magnetic component 170a and a second magnetic component 170b. The first magnetic component 170a and the second magnetic component 170b can be disposed within a second end 120a, 120b of the first and second sleeves 125a, 125b. FIG. 1D illustrates a first magnetic component 170a disposed within a second end 125a of a first sleeve 125a, in accordance with some embodiments of the present disclosure. In an exemplary and non-limiting embodiment, as illustrated at FIG. 1D, the first magnetic component 170a can be disposed axially within the second end 165a of the first sleeve 125a. Additionally, the first magnetic component 170a and the second magnetic component 170b can comprise a central hole 180 through which the inner tubing 150 can extend between the first and second sleeves 125a, 125b, as illustrated at FIGS. 1C and 1D. Allowing the inner tubing 150 to extend through the first and second magnetic sleeves 125a, 125b permits automatic reconnection after the first and second magnetic components 170a, 170b break apart. In other words, the first and second magnetic components 170a, 170b can automatically revert back to a connected state due to the inner tubing 150 and resistance created therein. Having automatic reconnection can be advantageous because it can allow a player to develop proper body placement on their own instead of relying on the training device as a crutch. Additionally, embodiments of the present disclosure that are automatic allow the player to hit continuously while using the device 100. While various components are discussed in reference to the first sleeve of the tennis swing timing device, it is understood that the second sleeve may comprise some or all of the components discussed with reference to the first sleeve.

The magnetic components of the tennis swing training device can be configured to transition the device 100 from an unconnected state to a connected state, as illustrated at FIGS. 1A-1C. The first magnetic component 170a and the second magnetic component 170b can connect the first and second sleeves 125a, 125b together. As will be understood by those skilled in the art, the first and second magnetic components 170a, 170b can be held together by a magnetic force. When the device is subjected to an external force exceeding the magnetic force, e.g., the player's arm moves between the first and second magnetic components 170a, 170b, the first and second magnetic components 170a, 170b can disengage and the first and second sleeves 125a, 125b can move apart.

Figure 2A:
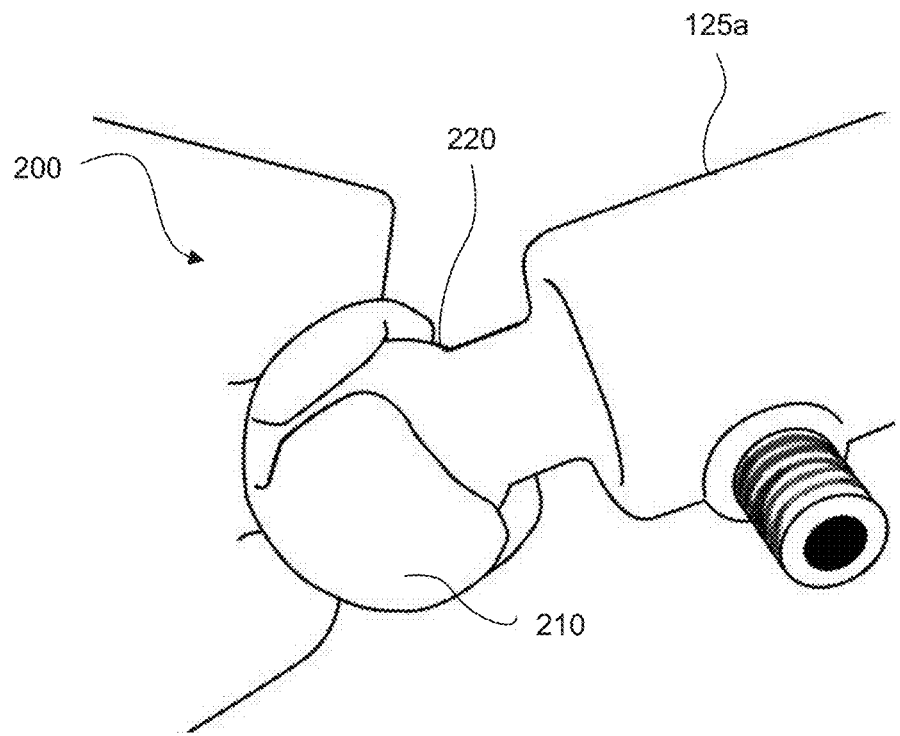
FIGS. 2A and 2B illustrate a ball-and-socket attachment in a connected and an unconnected state, respectively, in accordance with some embodiments of the present disclosure.
Figure 2B:
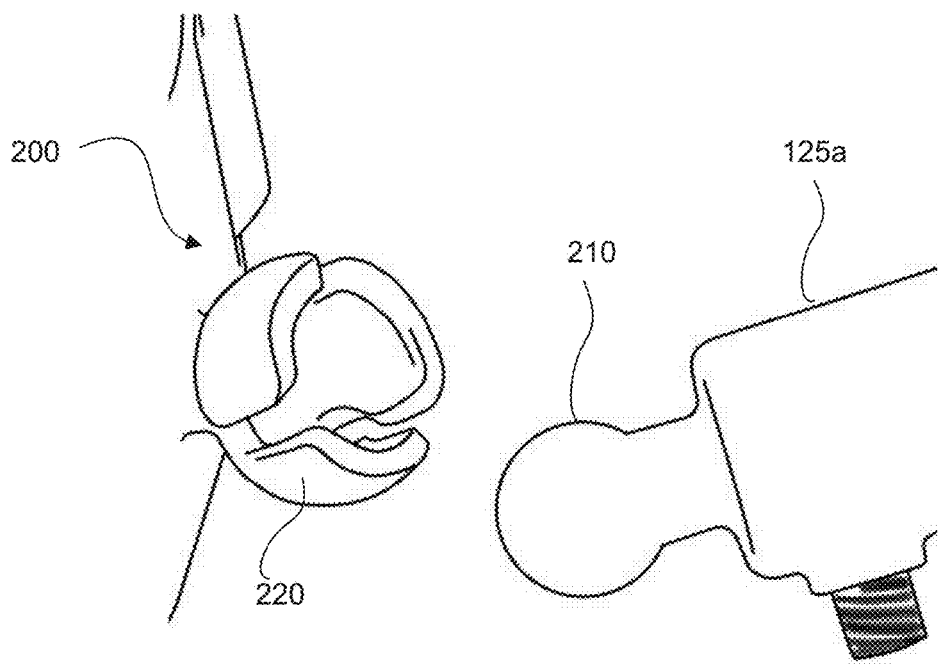

As discussed above with respect to FIG. 1A, in some embodiments, the first band 105 and the second band 110 can be attached to the first and second sleeves 125a, 125b via ball-and-socket attachment 130a, 130b. FIGS. 2A and 2B illustrate an exemplary and non-limiting embodiment of a ball-and-socket attachment 200. The ball-and-socket attachment can comprise a ball connector 210 and a socket connector 220. In some embodiments, the ball connector 210 can be snapped manually within the socket connector 220. As will be understood by those skilled in the art, a ball connector 210 can be a substantially rounded or spherical-shaped protrusion, a surface of which that can fit into a socket connector 220 that has a corresponding rounded depression. A ball and socket connector 200, like that illustrated in FIGS. 2A and 2B, can be advantageous because such a connector can provide a nearly infinite range of motion. Therefore, for example, the first and second sleeves 125a, 125b can have a flexible range of motion as it moves with respect to the first and second bands 105,110. Additionally, in an exemplary and non-limiting embodiment, the ball-and-socket connector can provide a stronger connection than the magnetic connection between the first and second sleeves thereby preventing the outer tubing from disconnecting from the first or second bands during use.

In some embodiments, and as illustrated at FIGS. 2A and 2B, the ball connector 210 can be integral to a first sleeve 125*a*. As such, the ball connector 210 can extend from the first end 115*a* of the first sleeve 125*a*. Yet, in other embodiments, it is understood that the ball connector 210 can be a separate part from the first and second sleeves 125*a*, 125*b*, and therefore can be attached and removed from the first and second sleeves 125*a*, 125*b*, as desired. For example, the ball connector can comprise a spherical-shaped component, a secondary tubing, and a helical threading disposed around at least a portion of an external surface of the secondary tubing. Similarly, the first and second sleeves can comprise a helical threading disposed around an internal surface proximate the second ends of the first and second sleeves. As such, the ball connector can screw into the first sleeve, and then the ball connector and first sleeve assembly can be coupled with the first band. Such a configuration can be advantageous, for example, because the outer tubing can be adjustable in size (i.e. length) and therefore provide a universal fit for wearers of a variety of ages, sizes, and heights. For instance, the first and second sleeves can be adjustable wherein the secondary tubing of the ball connector can come in a variety of lengths.

The socket connector 220 can attach to the first band 105 and the second band 110 in a variety of ways. For instance, in some embodiments, and as illustrated at FIG. 1A, the socket connector 220 can comprise a base portion 132*a*, 132*b* and a socket component 130*a*, 130*b*. The base portion 132*a*, 132*b* can be substantially flat and the socket component can extend from the base portion, forming a single unitary piece. Additionally, the base portion 132*a*, 132*b* can be attached to the first band 105 and the second band 110. The base portion 132*a*, 132*b* can be attached to the first and second band 105, 110 in a variety of ways, including, but not limited to, adhesive, stitching, welding, or other forms of bonding. For instance, in an embodiment comprising stitching, and as illustrated at FIG. 1A, the base 132*a*, 132*b* can comprise one or more slots disposed proximate the side edges of the base, and a portion of the band can be inserted within the slot, looped, and stitched over to secure the base to the band.

The described tennis swing timing devices can be advantageous as the first and second sleeves and the inner tubing can be replaced or interchanged with new components or different size and length components without having to obtain an entirely new device. In some embodiments, the first band and the second band may be adjustable so as to fit a variety of wearers. For instance, the first band and the second band can comprise a hook and loop fastener (e.g., Velcro), a plurality of snaps, or a strap and buckle, for fastening the bands around a body part of the wearer. In other embodiments, the first and second band may comprise elastic bands that can stretch and conform around a wearer's arm or other body part.

The first band and the second band can comprise any material that can provide an adequate fit and comfort while not sliding during use. For instance, the bands can comprise a pliable, relatively inelastic external material and a gripping material provided on the interior. A gripping material can comprise, for example, any material with or adapted to have a high coefficient of friction. Therefore, the material that will make contact with the wearer's skin or clothing can limit sliding of the first and second bands during use. In other embodiments, the band may comprise an elastic material so as to stretch to fit a variety of wearers but also fit snuggly upon application to a wearer's body. Additionally, in some embodiments the first band and the second band can be the same size, but need not be, depending on design preferences.

The first and second sleeves may comprise any material having enough pliability to facilitate movement while being durable enough to not rip easily during use. For instance, the first and second sleeve can comprise a pliable material. In other embodiments, the first and second sleeve can comprise a rigid material. Still, in some embodiments, the first and second sleeve may comprise both a pliable material and a rigid material. For instance, a first ends 115*a*, 115*b* of the first and second sleeves 125*a*, 125*b* can comprise a rigid material while a central portion 117*a*, 117*b* of each sleeve can comprise a pliable material. As such, the rigid material can be inserted within the pliable material and glued so as to create a dual-material sleeve. As will be understood, the first and second sleeves can be manufactured using a variety of manufacturing process including, but not limited, to 3D-printing and molding, for example, injection molding.

The inner tubing can comprise any resilient, highly elastic tubing. For instance, the inner tubing can comprise surgical tubing. Having an elastic inner tubing can allow for the inner tubing to stretch responsive to movement of the body parts associated with the first and second bands and also provide for separation of the first and second sleeves. For instance, a force applied to the inner tubing can cause it to stretch and build tension. When the external force applied to the magnetic components exceeds the magnetic force between them, the magnetic components will detach and the inner tubing can continue to stretch and build tension. The inner tubing can then retract or relax allowing for the two magnetic components to come together and reconnect. Such a mechanism can provide for automatic reattachment of the magnetic components.

The inner tubing can be any diameter including, but not limited to, ⅛-inch, ¼-inch, ⁵⁄₁₆-inch ⅜-inch, and ½-inch. The inner tubing can be any length so as to fit within the first and second sleeve. Additionally, the inner tubing can be attached to the outer tubing and the first and second bands in a variety of ways. In some embodiments, as illustrated at FIGS. 1A-1D, the inner tubing 150 can be fixed to the first and second sleeves, 125*a*, 125*b*. Affixing the inner tubing 150 to an interior of the first and second sleeves 125*a*, 125*b* can allow for removal of the inner tubing. For instance, one or more pinholes can be drilled into the first sleeve 125*a* and the second sleeve 125*b*. The a first end of the inner tubing can be pinned using pin member 140*a* proximate the first end 115*a* of the first sleeve 125*a* and a second end of the inner tubing can be pinned using pin number 140*b* proximate the first end 115*b* of the second sleeve 125*b*. In other embodiments, the inner tubing can be attached directly to the first band and the second band. For instance, the inner tubing can attach to the first and second bands through a ring. Once looped through the ring, the inner tubing can be tied to itself. In other embodiments, the inner tubing can be pulled through the pinhole of outer tubing and knotted. One or more of the embodiments discussed above can allow the inner tubing to be removable and therefore replaceable. For instance, after some time the inner tubing may lose its elasticity. Having a way to remove the inner tubing from the first and second sleeve can allow for the old tubing to be replaced by new tubing.

As discussed above, the releasable connector can comprise two opposing magnetic components. In some embodiments the magnetic components can comprise neodymium magnets. It is understood that, the magnets should be large enough to apply enough adherence while not being so big as to cause the device to weigh too much. In some embodiments, the described tennis training device may comprise a component for weakening the connection between the magnetic components. Depending on the strength of the user, the magnetic components may be too strong or too weak.

Therefore, it can be desirable to provide adjustability to the magnetic component. For instance, in some embodiments, a component can be added between proximate the first ends of each sleeve so as to limit the magnetic connection between the two components. The component may include a plastic insert that can be screwed onto each sleeve so as to prevent the two magnetic components from directly abutting each other. In other embodiments, the component may include various magnetic connectors having a variety of strengths that can be removed and replaced as desired.

It is understood that instead of being automatic, the device can require manual reassembly. For instance, in some embodiments, the tennis training device can comprise opposing hook and loop straps (e.g. Velcro straps) joining the first band and the second band. During the swing, for example, the hook and loop straps can disconnect and subsequently be reassembled manually by the wearer.

In another embodiment, the tennis swing timing device 100 can comprise an additional component to permit for adjusting the size of the device to accommodate a variety of wearers. The additional component can comprise an inelastic band comprising a plurality of holes. The inelastic band can be adapted to connect between the first band and the second band. The first and second sleeves can attach to the inelastic band in one or more of the plurality of holes. For instance, the first and second sleeves may comprise an additional screw member for inserting within one or more of the plurality of holes. Therefore, the first and second sleeves can be attached at various positions along the inelastic band. When the first and second sleeves are in a connected state, the inelastic band may be folded and when the first and second sleeves transition to an unconnected state, the inelastic band may straighten out to accommodate movement of a wearer's arm.

In other embodiments, the tennis training device 100 may require manual assembly. For instance, in one embodiment, the tennis training device can comprise two Velcro straps between the first and second bands. The first Velcro strap can be attached to the first band and the second Velcro strap can be attached to the second band. When in a connected position, the first Velcro strap can be connected to the second Velcro strap. As described above, the first Velcro strap can disconnect from the second Velcro strap. In another embodiment, the tennis training device can comprise a wrist band and Velcro tape on the racket with a Velcro strap joining the wrist and the racket of the wearer. The tape can be placed anywhere on the racket. In some embodiments, however, the Velcro tape is located below the base of the string bed of the racket.

In some embodiments, the tennis training device can comprise an add-on. The add-on can address a situation where the wearer pulls her elbow back behind her body during the swing. The add-on can comprise a hard, flat, inelastic component. In some embodiments, the component can attach either on the back of the shoulder or the top of the upper arm. During the swing, the add-on may contact the back of the shoulder or the top of the upper arm if the wearer tries to pull her elbow back, thereby preventing the wearer from pulling her elbow back behind her body during the swing.

Figure 3C:
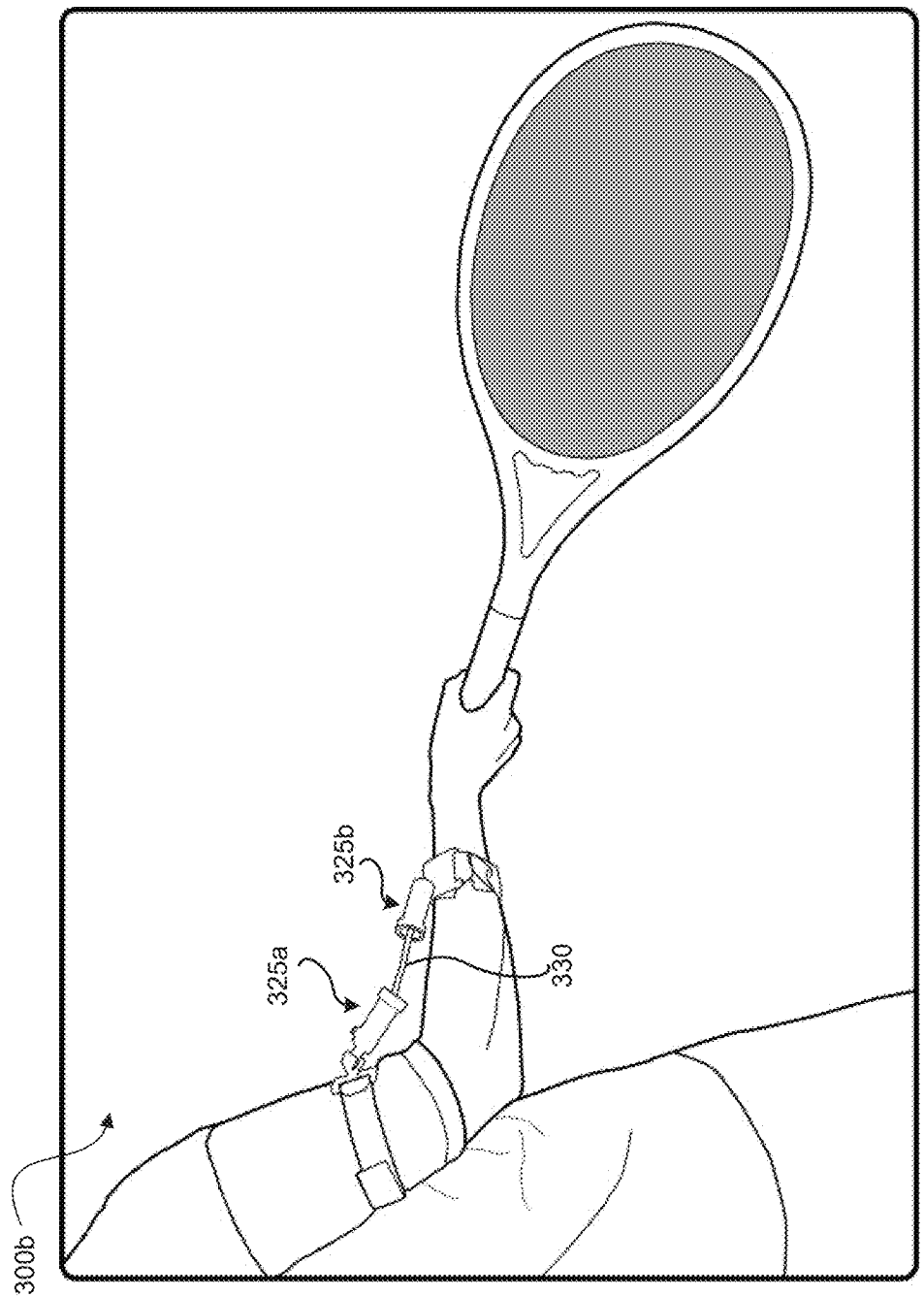
FIG. 3C illustrates a tennis swing timing device in an unconnected state when worn by a wearer, in accordance with some embodiments of the present disclosure.

In view of the tennis swing timing devices discussed above, embodiments of the present disclosure can also comprise a system for improving a wearer's tennis swing timing, as illustrated at FIGS. 3A-3C Like the devices discussed previously, the system can comprise a first band 305 and a second band 310. The first band 305 is adapted to be worn on an upper portion of a wearer's first arm and the second band 310 is adapted to be worn on a lower portion of the wearer's first arm. As discussed above, a first sleeve 325a and a second sleeve 325b can be affixed to the first band 305 and the second band 310. An inner tubing can be housed within the first and second sleeves 325a, 325b and extend from about a first end of the first sleeve 325a to about a first end of the second sleeve 320, as discussed above. Additionally, as discussed previously, the outer tubing 320 can comprise a first sleeve 325a releaseably connected to a second sleeve 325b via a first magnetic component and a second magnetic component. The first and second magnetic components can be configured to transition the first and second sleeve 325a,325b from a connected state 300a to an unconnected state 300b, as illustrated at FIGS. 3A-3C. As seen at FIG. 3C, when the magnetic components are in an unconnected state 300b, at least a portion of the inner tubing 330 is exposed between the first sleeve 325a and the second sleeve 325b. As discussed above with respect to FIGS. 2A and 2C, in some embodiments, the system can comprise a first ball connector 345a integral to the first end of the first sleeve 325a, and a second ball connector 345b integral to the first end of the second sleeve 325b. Additionally, the system can comprise a first socket connector 340a adapted to receive the first ball connector 345a and a second socket connector 340b adapted to receive the second ball connector 345b.

When in a connected position, the first and second sleeves 325a, 325b can be attached between the forearm and the upper arm, holding the arm at about a 90-degree angle, as shown at FIG. 3B. When the arm is extended, or moved to an angle exceeding 90 degrees, tension caused by the extension can in turn cause the inner tubing to stretch and the magnetic components to disconnect, as illustrated at FIG. 3C. When the arm is brought back to about a 90-degree angle, the inner tubing can retract and the first and the magnetic components can re-connect, thereby providing automatic reconnection of the device. As will be understood, the system can comprise some or all of the features discussed previously with respect to the tennis swing timing devices.

In another embodiment, a similar connection can be created between the wrist and racket. The first band can attach around a wrist of the wearer and the second band can connect to the racket with the first and second sleeves joining the wrist to the racket. As will be understood, movement of one body part with respect to the other can affect the state of the device, changing it from a connected to an unconnected state and vice versa.

Various embodiments of the present disclosure can be used for assistance in a variety of tennis swings including the forehand groundstroke, the backhand groundstroke, the two-handed backhand, the serve, and the backhand splice. Embodiments for each stroke will be discussed in more detail below.

Embodiments of the present disclosure can assist a player with managing her arm placement and timing during forehand groundstroke preparation. In some embodiments, systems and devices for improving tennis swing timing and preparation can prevent the player from overusing her arms during preparation by providing the player with feedback that her arms are in an improper position. The significance of maintaining proper arm placement before a player starts rotating her hips to begin the swing is that the player's arm remains sufficiently bent with the racket in line with the hand so that the force from the hip rotation will generate downward motion of the arm and racket on its own accord. That is, the hip rotation, gravity, and the weight and momentum of the racket can generate the downward motion. Moreover, such assistance can occur even when the ball is low. The player can be coerced into generating continued downward motion in her arm and racket after she starts to swing with her hips. Because the ball is well below hand-level when the player starts to swing, she has to let the downward motion continue to make contact.

When assisting a player with forehand groundstroke preparation, the systems and devices can provide feedback to the player if she drops her hand down before executing the swing. For instance, if the player is overusing her arms in her stroke preparation, the feedback can comprise detachment of the first magnetic component from the second magnetic component. Therefore, during training, the player must work to maintain the magnetic connection between the magnetic components. The player must maintain proper racket and hand height until the player starts swinging from the hips, otherwise the first and second magnetic components will detach, indicating that the player lost proper racket and hand height.

In some embodiments, when worn by a player to improve the forehand groundstroke technique, the described systems and devices can be worn as discussed above with respect to FIGS. 3A-3C. When in use, the tennis training device can hold the upper arm and forearm at approximately a 90-degree angle. When the player straightens out her arm, the two magnetic components holding the angle between the upper arm and forearm can disconnect thereby providing feedback to the player that the arm is starting to straighten out. When preparing for a forehand groundstroke, the player must follow a direct sequence of events to execute a properly timed forehand groundstroke. At the same time, the player must maintain proper arm placement during preparation, e.g. before the player starts to swing with her arm. Therefore, for instance, the device can hold the player's arm at the proper angle, less than or equal to 90-degrees, up and until the player rotates her hips and upper body. Then, the player may extend her arm following through with the swing with the racket coming in contact with the ball. If the player extends her arm too soon during the preparation, the two magnetic components will disconnect thereby providing the player with feedback that she has lost proper timing and arm placement.

In another embodiment, the first band can be attached around the wrist and the second band can attach to the racket. The first sleeve, the second sleeve, and the first and second magnetic components, can join the wrist to the racket. When in use, the tennis training device can hold the wrist and the racket at approximately a 90-degree angle. When the wearer drops the racket downwards relative to the wrist, the releasable connectors may detach from each other, letting the player know that the racket is dropping and the wrist is getting flimsy. As will be understood, the forearm and upper arm device can be worn in combination with the wrist and racket device to cure both problems with arm placement and timing during the swing.

In some embodiments, the disclosed systems and methods can be adapted for improvement of a backhands groundstroke. The first band can be configured to be worn around the torso of a player. In some embodiments, the first band can be worn on an upper portion on the torso, proximate the armpits of the player. The second band can attach to the racket on the side of the racket's throat. When used to improve a backhands groundstroke, the device will stay intact until the player starts the backhands groundstroke with her hips, at which point the releasable connector will disconnect.

Additionally, in some embodiments, where a player may be turning too far while executing the backhand groundstroke, the first and second sleeves can be worn across the player's body. For instance, if the player is right-handed and holding the racket in her right hand, the first band can be rotated about the player's torso so that the first sleeve originates on the player's left side and extends across the player's body towards the player's racket. Such a configuration can prevent the player from overturning so as to mess up the angle of her shot and lose the ability to strike the ball cleanly.

Embodiments of the present disclosure can assist players in training for a proper two-handed backhands stroke. The most reoccurring problem in the two-handed backhands stroke is a player overturning her body prior to engaging in the swing. For training a player for proper preparation and timing of the two-handed backhands, the described devices can attach around the right or the left arm of the wearer. Generally, the device can be worn on the right arm if the player pulls her one or both of her arms back too far, which is a greater problem in one-handed backhands as opposed to two-handed backhands. Further, the invention can be used as a feedback tool for a particular type of backhand in which the player first lowers her hands and racket on the first step, resulting with the player facing sideways, and then lifting her hands as the player steps into the stroke. When used for a two-handed backhands, the player can focus on detaching the releasable connector on the first step and re-attaching it on the second step.

As discussed in the embodiments described above, the first band can attach around the upper arm and the second band can attach around the forearm. When the second step ends, the player can start to swing with the hips and the releasable connector can disconnect to permit the arms to flow through the swing. In some embodiments, the player may also wear a wrist and racket connection which should stay connected throughout the preparation until the player starts the swing with the hips.

Embodiments of the present disclosure can be adapted for use during a serve. For instance, the described systems and devices can also be used as a feedback tool for serves much in the same way as it is used for the type of backhand discussed above and may be attached when the player is starting to serve. In some embodiments, the first band can attach around the upper arm and the second band can attach around the forearm. When the player starts transferring her weight backwards, the releasable connector can detach. As the player starts transferring her weight forward, the releasable connector can attach automatically after which the player can push up with her legs to start the service motion.

Optionally, the player can keep the invention connected until she pushes up with her legs. The former is for a more traditional service motion. The latter is for a more abbreviated motion.

Embodiments of the described tennis swing timing device can also be used to learn a backhand slice. During preparation of the swing, the magnetic components can remain attached. If the player keeps the magnetic components intact until the swing starts, the player will have kept the weight of the racket in position to work properly for the swing.

Embodiments of the described tennis swing timing device can be used to assist with a backhand volley. In some embodiments, the first band can attach to the upper arm and the second band can attach to the racket. In embodiments adapted for use during the backhand volley, the first and second sleeves and the inner tubing may be longer.

Forehand Groundstroke Device

Embodiments of the present disclosure can include a forehand groundstroke device to assist players with learning, practicing, and improving tennis forehand groundstrokes. In some embodiments, the forehand groundstroke device can make it easier for a player to generate downward momentum in the racket after starting to swing with the hips. The disclosed forehand groundstroke devices can efficiently and effectively guide the player to proper groundstroke technique throughout the forehand swing, both in the swing's preparation and the swing itself.

Figure 4:
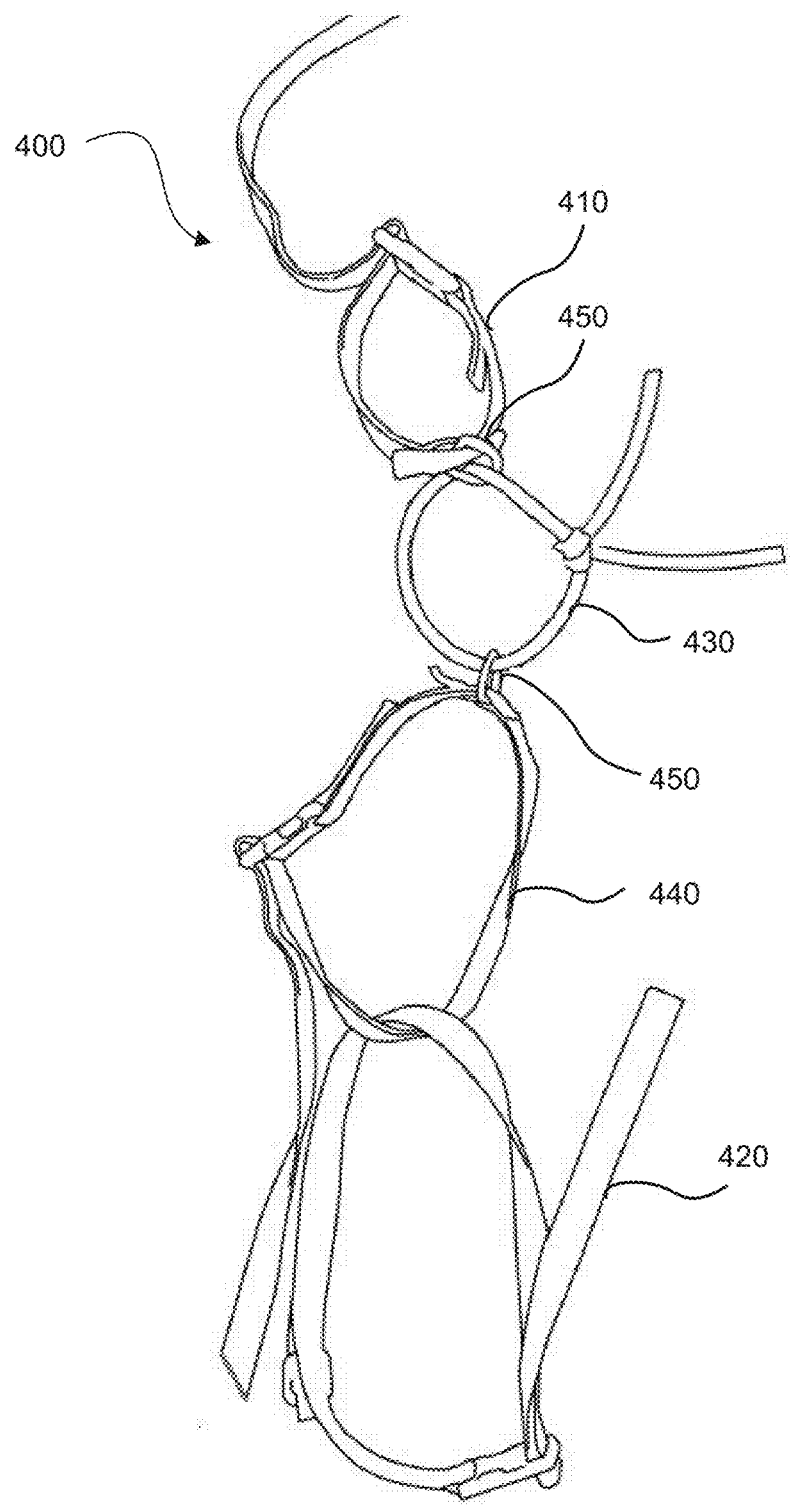
FIG. 4 illustrates a forehand groundstroke device, in accordance with some embodiments of the present disclosure.

Embodiments of the forehand groundstroke device 400 can comprise a first band 410, a second band 420, a resistance tubing 430, and an extension component 440. The resistance tubing 430 can be adapted to connect between the first band 410 and the extension component 440, and the extension component 440 can be adapted to connect between the resistance tubing 430 and the second band 420. In some embodiments, as illustrated at FIG. 4, the resistance tubing 430 can optionally connect to the extension component 440 and the first band 410 via a plurality of rings 450. The plurality of metal rings 450 can comprise metallic or plastic D-rings and can be attached to the first band and the extension component in a variety of ways. For example, and not limitation, the plurality of rings can be stitched into the first band and the extension component. In other embodiments, the extension component and the resistance tubing can be looped through the D-rings. Yet, in other embodiments, the resistance tubing can be tied or stitched to the first band and the extension component without the plurality of rings.

The resistance tubing can be adjustable in length. For instance, in some embodiments, the resistance tubing can be looped through the plurality of rings and tied, as illustrated at FIG. 4. Therefore, the resistance tubing can be removed and replaced with a longer or shorter resistance tubing as desired. As discussed above, the resistance tubing can comprise surgical tubing of various resistances and various diameters.

The extension component can comprise a variety of mechanisms that provide for extending the resistance tubing to a point higher on the wearer's body. For instance, in some embodiments, the extension component can comprise a strap and buckle, as illustrated at FIG. 4. Therefore, the extension component may be removable from the device and replaced by another extension component that may be a different size, shape, or structure. In some embodiments, the extension component may comprise a rigid piece of tubing connected between the second band and the resistance tubing. The rigid piece of tubing may comprise some or all of the features as discussed above with respect to the first and second sleeves shown in FIGS. 1A-3C.

Figure 5B:
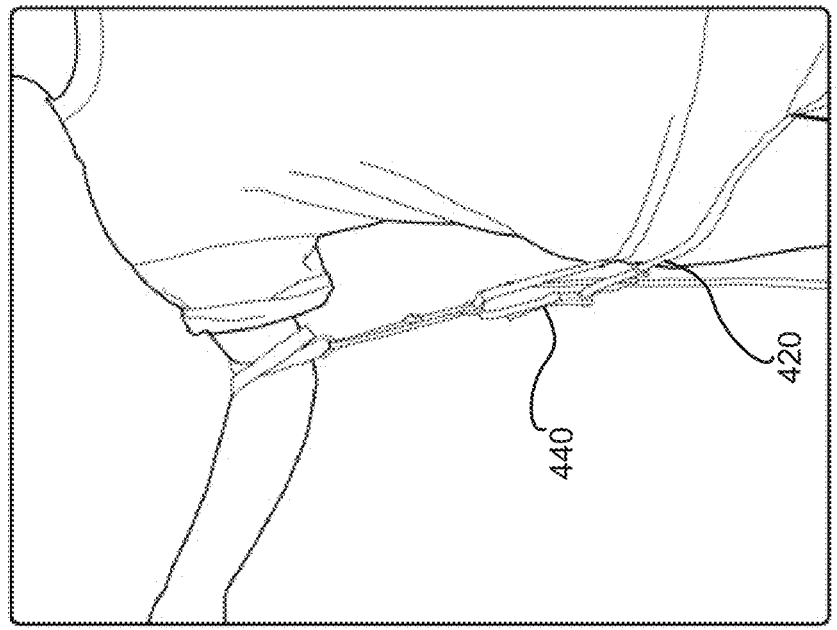
FIGS. 5A and 5B illustrate a forehand groundstroke device when worn by a wearer, in accordance with some embodiments of the present disclosure.
Figure 5A:
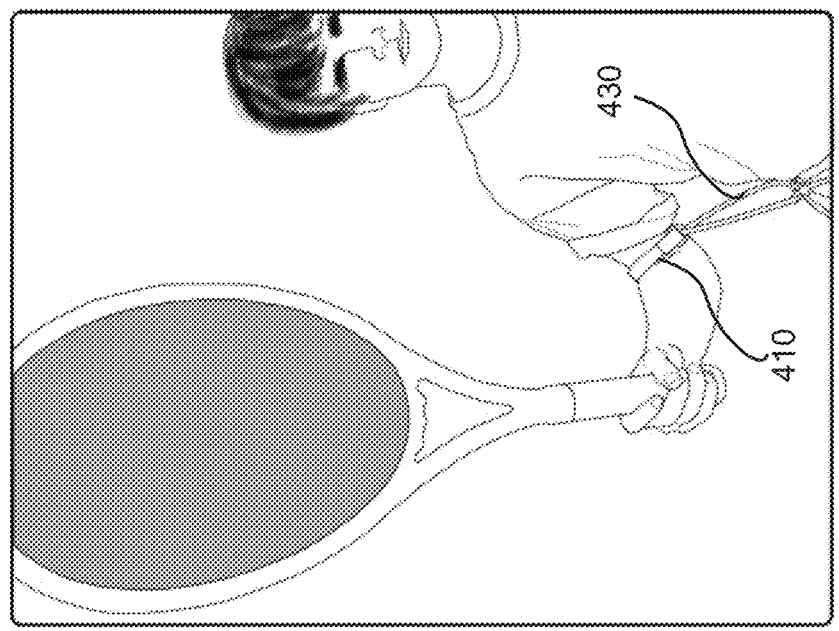

In some embodiments, the first band 410 can attach around the upper arm of a player, and the second band 420 can attach around the upper leg (e.g., thigh) of the player, as illustrated at FIGS. 5A and 5B. The extension component 440 can connect to the second band 420 and the resistance tubing 430 can connect to the extension component 440 and the first band 410. As will be understood, the extension component 440 can elevate the resistance band 430 proximate the wearer's waist. Elevating the resistance band to a position proximate the wearer's waist can be advantageous because an adequate downward force may be achieved when the second band is located at a lower position, such as at the waist or on the leg. If the second band is located too high on a player's body, it may generate too much force in a horizontal direction. As such, the second band can be attached anywhere on the leg including, but not limited to, the upper leg of the player or the lower leg of the player, below the player's knee. Finally, in some embodiments, the device can comprise an additional resistance tubing connecting between the upper arm band and a wrist or forearm of the wearer. The additional resistance tubing can connect to the wrist or forearm of wearer in a variety of ways including a third band or simply typing the resistance tubing around the forearm or wrist of the wearer.

Additionally, in an embodiment as illustrated at FIGS. 5A and 5B, the resistance tubing can connect to a portion of the first band located proximate a front portion of the player's arm. In another embodiment, the resistance band can otherwise wrap around a portion of the band located proximate a back portion of the player's arm and connect to the first band proximate a front portion of the player's arm. As discussed above, the resistance tubing can connect to the first band via one or more rings.

In another embodiment of the forehand groundstroke devices, the extension component is optional. For instance, the first band can attach around the upper arm of a player, and the second band attach around the torso of the player. The resistance tubing can connect to the torso band on the right side of the wearer near the rib cage and also to the upper arm band proximate the inner arm part of the wearer. Therefore, when the inner tubing is connected between the torso and the upper arm of the wearer, it can provide a connection between the first band and the second band and resistance to the player's arm as she executes a forehand groundstroke.

As will be understood by persons skilled in the art, the forehand groundstroke device can be worn in both a right-handed configuration and a left-handed configuration. For instance, in embodiments comprising an upper arm band and an upper leg band, if a player is right-handed, the upper arm band can attach around the right arm and the upper leg band can attach around the right leg of the player. In an alternative embodiment for left-handed players, the upper arm band can attach around the left arm of the player and the upper leg band can attach around the left leg of the player.

During proper use of the forehand groundstroke device, the player's elbow can lift when the player turns sideways to hit the ball, which builds up resistance in the surgical tubing. Then, the player must maintain the resistance as she steps into the shot and the hips start to rotate. After the player rotates her hips, she can release the resistance. When the resistance is released, a downward force can be applied to the arm, and thus, to the racket. Then, in the follow-through, the player can feel the resistance in the tubing build again. The resistance building here indicates that the player used the hips and allowed the swing properly.

It is understood that the various components of the forehand groundstroke device can share the same properties, materials, and configurations described with respect to the tennis swing timing device above. Additionally, the foreground groundstroke device can be worn in conjunction with the other devices described herein.

Groundstroke Preparation Devices

For proper groundstrokes, the body must work in a particular sequence to hit a tennis ball properly. The disclosed devices can train a player to develop a feel for the proper sequence of movement to achieve a proper groundstroke, the sequence including a swing originating from the body and hips rather than the arm. The necessary sequence for proper groundstrokes therefore begins with the upper body and the hips. However, for many players, it is intuitive to reach their arms back during preparation thereby disconnecting their arm from their body. The disclosed device can improve arm placement during groundstroke preparation by enabling the user to keep her arm close to her body. By keeping the arm connected, the player can now start the swing with her body and hips rather than her arm.

Figure 6:
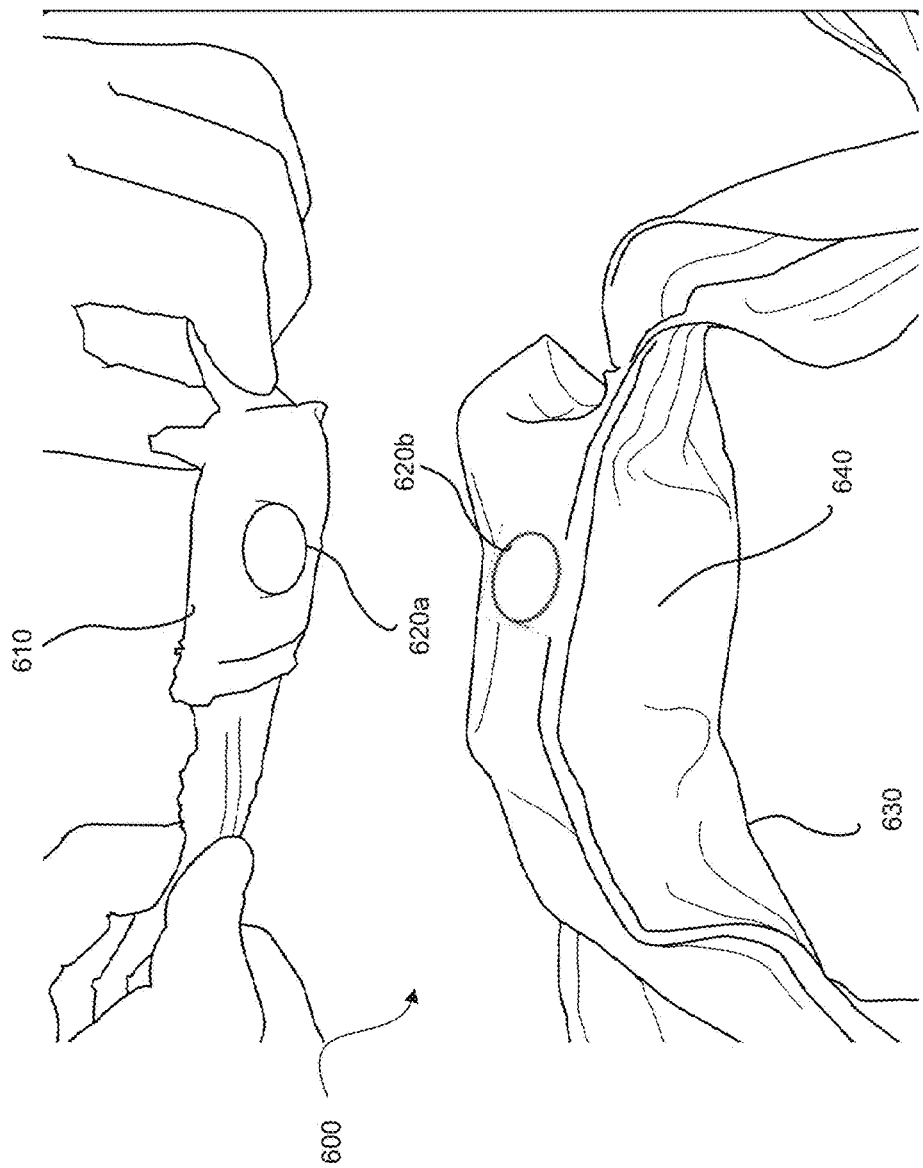
FIG. 6 illustrates a groundstroke preparation device, in accordance with some embodiments of the present disclosure.
Figure 7B:
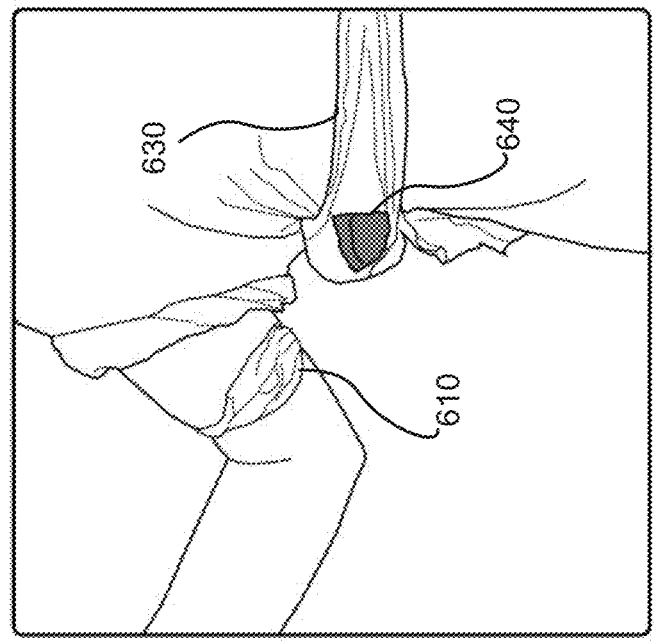
FIGS. 7A-7C illustrate a groundstroke preparation device when worn by a wearer, in accordance with some embodiments of the present disclosure.
Figure 7A:
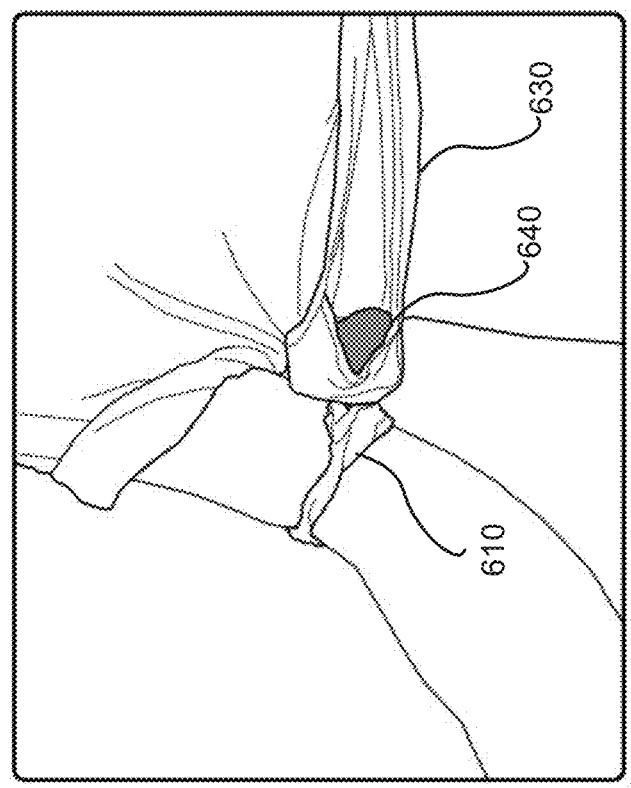

As illustrated at FIG. 6, a groundstroke preparation device 600 can comprise a first band 610 and a second band 630. The first band 610 and the second band 630 can each comprise an adherent component 620a, 620b attached proximate the center of the first and second bands 610, 630 with each component oriented towards the other. Additionally, an insert 640 can be disposed within the second band 630. In some embodiments, and as illustrated at FIG. 7A, when a player wears the groundstroke preparation device 600 the insert 640 can extend from the second band 630 and towards the first band 610. The insert can be advantageous as it can provide the player with added flexibility when preparing for a groundstroke. For instance, in a configuration as illustrated at FIGS. 7A and 7B, where the first band 610 is worn on the player's arm and the second band 630 is worn on a player's torso, the insert 640 can provide a player with additional space between her arm and her torso. Additionally, the insert can comprise any material including but not limited to foam, including high-density foam, polyethylene foam, closed-cell polyethylene foam, soft plastics, and beading.

The adherent components can be any type connector that provides a releasable connection between the first band and the second band. For instance the adherent components can comprise a pair of magnets, snaps, or hook and loop fasteners (e.g. Velcro). In an embodiment where the adherent components comprise magnets, the connection between the first and second bands can be established automatically, as described above regarding the tennis swing timing device. In another embodiment where the adherent components comprises a hook and loop fastener, the device can provide the player with auditory feedback if the connection between the first and second bands is broken.

Additionally, in an embodiment where the adherent components comprise a pair of magnets, the magnets can be strong enough to guide the user into the proper motion but weak enough to allow the player to break the magnets apart when she starts to swing. It is understood that the magnets can come in a variety of shapes and strengths, as discussed above with respect to the tennis swing timing device.

Figure 7C:
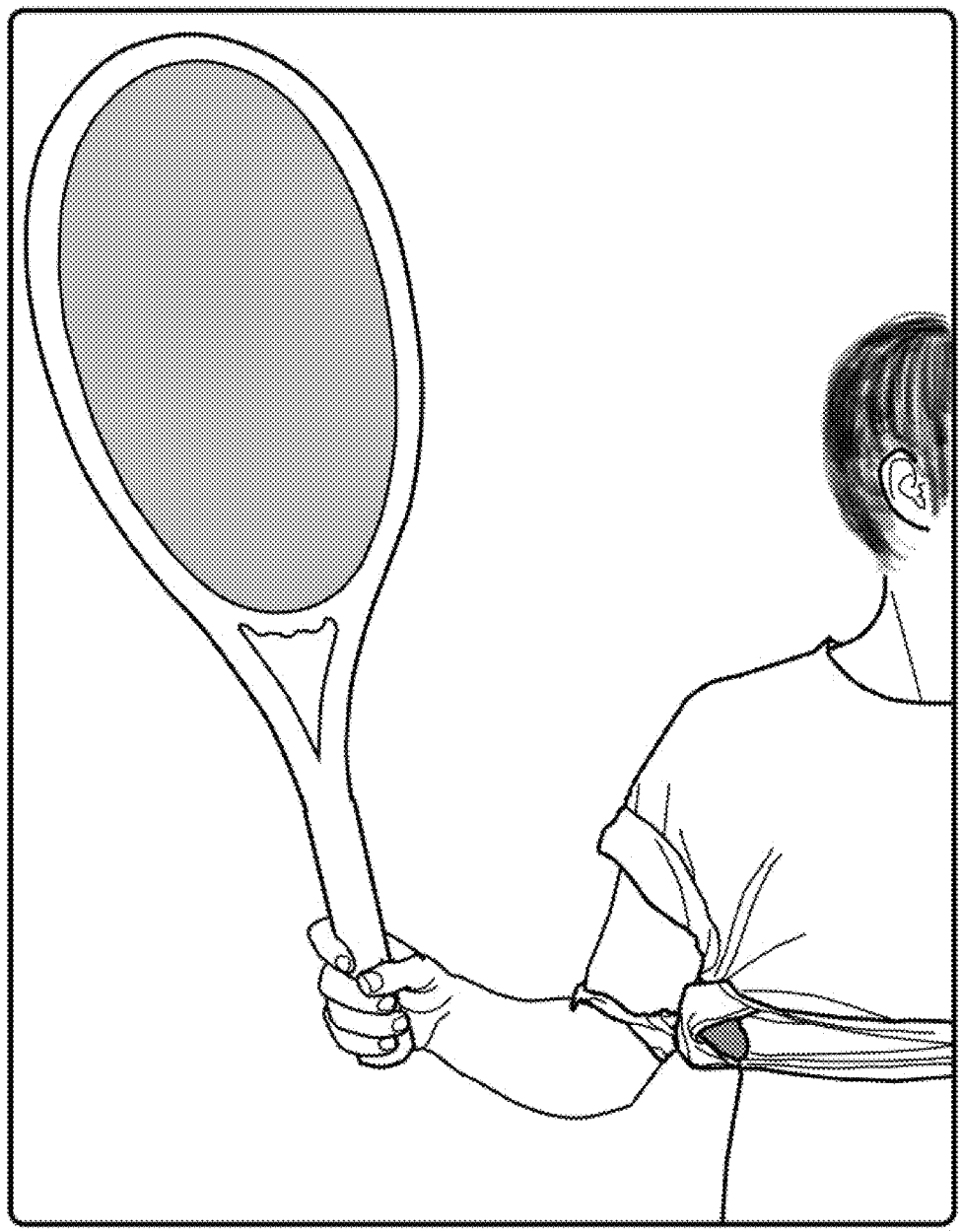

In some embodiments, the device for improving arm placement during preparation for a groundstroke can be worn by a player in the following way, and as illustrated at FIGS. 7A-7C. The first band 610 can attach around the upper arm of the player, and the second band 630 can attach around the torso of the player. When worn together, the first band 610 and the second 630 band can be worn at approximately the same level as each other, such that once the player's arm is in the proper position, the adherent component on the first band and the adherent component on the second band can connect together and hold the player's arm in place proximate the player's torso, as illustrated at FIG. 7A and 7C. When in use, proper swing preparation can be achieved if the magnets stay connected until the swing begins with her upper body or her hips. Therefore, once the player begins to rotate her hips, the magnets can break apart to allow her to complete the swing, as illustrated at FIG. 7B. Therefore, for instance, the player can be provided with feedback if her arm is in the proper position during swing preparation. For example, if the adherent components comprise a pair of magnetic components, the magnetic components can remain connected until the player begins to swing with her upper body and her hips. Such a device is advantageous because it can provide constant feedback throughout the swing and guide the user's motions to enable a proper swing beginning with the player's upper body and hips.

It is understood that the various components of the groundstroke preparation device can share the same properties, materials, and configurations described with respect to the tennis swing timing device above.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described in relation to tennis training devices. Additionally, other equivalent methods or composition to these described aspects are also contemplated by the teachings herein. Therefore, the present disclosure should not be limited to any single aspect, but rather construed in breadth and scope in accordance with the appended claims.

I claim:

1. A tennis training system comprising:
   a first band adapted to be worn on an upper portion of a wearer's first arm;
   a second band adapted to be worn on a lower portion of the wearer's first arm;
   a first sleeve having a first end and a second end, the first end affixed to the first band and the second end housing a first magnetic component;
   a second sleeve opposing the first sleeve, the second sleeve having a first end and a second end, the first end affixed to the second band and the second end housing a second magnetic component; and
   an inner tubing extending substantially between the first end of the first sleeve and the first end of the second sleeve,
   wherein the first and second magnetic components are configured to transition the first and second sleeves from an unconnected state, in which at least a portion of the inner tubing is disposed between the first sleeve and the second sleeve, to a connected state, and
   wherein tension created between the upper and lower portions of the wearer's first arm as an angle between the upper and lower portions increases causes the first and second sleeves to transition from the connected state to the unconnected state.

2. The system of claim 1, further comprising a first ball connector integral to the first end of the first sleeve and a second ball connector integral to the first end of the second sleeve.

3. The system of claim 2, wherein the first band comprises a first socket connector adapted to receive the first ball connector and the second band comprises a second socket connector adapted to receive the second ball connector.

4. The system of claim 1, wherein a central portion of the first sleeve and a central portion of the second sleeve comprise a pliable material.

5. The system of claim 4, wherein the second end of the first sleeve and the second end of the second sleeve comprise a rigid material.

6. The system of claim 1, wherein the inner tubing comprises an elastic material such that when the magnetic components are in an unconnected state, the inner tubing increases in length.

7. The system of claim 1, wherein the inner tubing is fixed proximate the first end of the first sleeve and the first end of the second sleeve via respective pin members.

8. The system of claim 1, wherein when the magnetic components are in a connected state, the angle between the upper and lower portions of the wearer's first arm is 90 degrees or less.

9. The system of claim 1, wherein when the magnetic components are in an unconnected state, an angle between the upper and lower portions of the wearer's first arm is approximately 90 degrees, or more.

10. The system of claim 1, wherein the first magnetic component and the second component each comprise a central hole and the inner tubing extends through the central hole.

11. The system of claim 1, wherein the first and second magnetic components are configured to automatically transition the first sleeve and the second sleeve from an unconnected state to a connected state.

12. A tennis swing timing device comprising:
a first band having a first socket connector;
a second band having a second socket connector;
a first sleeve having (i) a first ball connector on a first end, the first sleeve affixed to the first band via a first ball-and-socket connection between the first ball connector and the first socket connector and (ii) a second end housing a first magnetic component;
a second sleeve opposing the first sleeve, the second sleeve having (i) a second ball connector on a first end, the second sleeve affixed to the second band via a second ball-and-socket connection and (ii) a second end housing a second magnetic component; and
an inner tubing extending substantially between the first end of the first sleeve and the first end of the second sleeve,
wherein the first and second magnetic components are configured to transition the first sleeve and the second sleeve from an unconnected state, in which a portion of the inner tubing is exposed between the first and second sleeves, to a connected state.

13. The tennis swing timing device of claim 12, wherein a central portion of the first sleeve and a central portion of the second sleeve comprise a pliable material.

14. The tennis swing timing device of claim 13, wherein the second end of the first sleeve and the second end of the second sleeve comprise a rigid material.

15. The tennis swing timing device of claim 12, wherein the inner tubing comprises an elastic material such that when the magnetic components are in an unconnected state, the inner tubing increases in length.

16. The tennis swing timing device of claim 12, wherein the inner tubing comprises surgical tubing.

17. The tennis swing timing device of claim 12, wherein a first end of the inner tubing is fixed proximate the first end of the first sleeve and a second end of the inner tubing is fixed proximate the first end of the second sleeve via respective pin members.

18. The tennis swing timing device of claim 12, wherein the first magnetic component and the second component each comprise a central hole and the inner tubing extends through the central hole.

19. The tennis swing timing device of claim 12, wherein when the first and second sleeves are in a connected state, an angle between an upper portion of a wearer's first arm and a lower portion of the wearer's first arm is approximately 90 degrees or less.

20. The tennis swing timing device of claim 12, wherein when the first and second sleeves are in an unconnected state, an angle between an upper portion of a wearer's first arm and a lower portion of the wearer's first arm is approximately 90 degrees or more.

* * * * *